US006886639B2

(12) United States Patent
Arvidson et al.

(10) Patent No.: US 6,886,639 B2
(45) Date of Patent: May 3, 2005

(54) HIGH FLOW FOAM SYSTEM FOR FIRE FIGHTING APPLICATIONS

(75) Inventors: Lawrence C. Arvidson, Andover, MN (US); Robert S. Horeck, Fridley, MN (US); Robert L. Hosfield, Centerville, MN (US)

(73) Assignee: Hypro Corporation, St. Paul, MN (US)

(*) Notice: Subject to any disclaimer, the term of this patent is extended or adjusted under 35 U.S.C. 154(b) by 23 days.

(21) Appl. No.: 10/652,527

(22) Filed: Aug. 29, 2003

(65) Prior Publication Data

US 2005/0045345 A1 Mar. 3, 2005

(51) Int. Cl.[7] ........................ A62C 35/00; A62C 27/00; A62C 5/02; A01G 27/00; B67D 5/16

(52) U.S. Cl. ............................. 169/14; 169/15; 169/24; 239/68; 239/69; 239/172; 239/310; 222/71; 137/101.21

(58) Field of Search .............................. 169/14, 15, 24, 169/5, 13; 239/68, 69, 172, 310, 67, 71, 318, 407, 413; 137/101.21; 222/71

(56) References Cited

U.S. PATENT DOCUMENTS 4,246,969 A * 1/1981 McLoughlin et al. ......... 169/13
4,324,294 A * 4/1982 McLoughlin et al. ......... 169/13
5,313,548 A 5/1994 Arvidson et al.
5,494,112 A 2/1996 Arvidson et al.
RE35,362 E 10/1996 Arvidson et al.
5,764,463 A 6/1998 Arvidson et al.
5,765,644 A 6/1998 Arvidson et al.
5,816,328 A * 10/1998 Mason et al. ................. 169/15
5,979,564 A * 11/1999 Crabtree ...................... 169/15
6,009,953 A * 1/2000 Laskaris et al. .............. 169/13
6,085,586 A * 7/2000 Arvidson et al. ............. 73/201
6,454,540 B1 * 9/2002 Terefinko et al. ............. 417/46

* cited by examiner

*Primary Examiner*—David A. Scherbel
*Assistant Examiner*—Darren Gorman
(74) *Attorney, Agent, or Firm*—Michael Best & Friedrich LLP

(57) ABSTRACT

A fire-fighting system in which multiple water discharge lines each have associated with them a foam concentrate delivery line where each of the foam concentrate delivery lines are supplied from a foam concentrate tank by way of a positive displacement pump having the capability of having its flow rate adjusted. Each of the water discharge lines includes a flow meter as do all of the foam concentrate delivery lines. The foam concentrate delivery lines also include a valve whose orifice size is electrically controlled. Associated with each of the foam concentrate delivery lines is a microprocessor-based line controller module that receives inputs from the flow meters in the water discharge lines and the flow meters in the foam concentrate delivery lines whereby the proportion of foam concentrate to water in the separate water discharge lines can be set at predetermined values. A main microprocessor-based controller is coupled to each of the several line controllers and the output of the main controller is used to adjust the output flow rate of the foam concentrate pump.

11 Claims, 4 Drawing Sheets

HIGH FLOW FOAM SYSTEM FOR FIRE FIGHTING APPLICATIONS

BACKGROUND OF THE INVENTION

I. Field of the Invention

This invention relates generally to fire fighting equipment, and more particularly to a control system for controlling the addition of a liquid chemical foamant to selected ones of a plurality of water delivery fire hoses such that the concentration of liquid chemical foamant at the discharge end of the fire hoses if maintained at a preset desired value as the water flow rate through the several hoses is made to vary.

II. Discussion of the Prior Art

Fire trucks, fire boats, military equipment and the like used in extinguishing large industrial fires will typically have a plurality of water discharge lines coupled through a manifold to a large capacity mid-ship pump where the discharge lines vary in size from those feeding a water cannon capable of delivering 1,000 gallons-per-minute or more to hand lines used in mopping-up operations that may carry 20 gallons-per-minute or less.

One of the most significant advancement in the filed of fire fighting has come through the use of chemical foamants specifically formulated to augment the fire fighting ability of water. Foam injection systems have been designed to introduce liquid chemical foamant concentrate into a water stream being directed at a fire. A key advantage to using such foams is the dramatic reduction in the time required to extinguish fires. It has been demonstrated that Class A foam is from five to ten more times more effective as a fire suppressant than water alone. Utilizing foam, fires are extinguished faster and with substantially less water damage. The foam proves to be an effective barrier, preventing fire from spreading and protecting adjacent structures. As is set out in the Arvidson et al. U.S. Reissue Pat. No. 35,362, the teachings of which are hereby incorporated by reference, it is desirable to have a foam injection system that is capable of automatically proportioning the foam additive in an exact concentration required for the specific fire-fighting problem, but without overusing and, therefore, wasting the chemical foamant. That patent describes a system that is readily suited to residential fires, automobile fires and those applications where water flow rates tend to be below 1,000 gallons-per-minute. Moreover, the system shown in the aforereferenced Arvidson Reissue Patent accommodates only a single injection point. In that fire vehicles designed for use in fighting large industrial fires may have several discharge lines of varying capacity, a need exists for a foam injection system that permits foam concentrate from a single storage tank to be injected into a plurality of water discharge lines where the water flow rate through the individual lines may vary drastically. For example, one discharge line may be feeding a water cannon while discharge lines are hand lines used in mopping operations.

A need exists for a foam injection system for use with a fire truck or other fire fighting apparatus where there is a plurality of discharge lines downstream from a main water pump. A desirable feature of such a system is to have some or all of the discharge lines capable of flowing a water/foam mixture, or water only, out the nozzle of the discharge lines. It will frequently happen that the foam/water proportioning in each line be different depending upon the type of fire being fought.

The foam proportioning system must also be capable of displaying a variety of parameters to fire-fighting personnel including, but not necessarily limited to, raw water flow rate, total water used, percent of foam concentrate in each of a plurality of water discharge lines, the total amount of concentrate used in all of the lines, a low concentrate supply warning, line pressure readings.

SUMMARY OF THE INVENTION

The foregoing objectives are achieved by providing a foam proportioning apparatus for controlling and monitoring the introduction of a liquid chemical foam concentrate into a plurality of water discharge lines in a fire-fighting system. The foam proportioning apparatus includes a tank in which a supply of a liquid chemical foamant is held. A foam pump couples the outlet of the tank to a plurality of foam concentrate delivery lines that are used to inject foam concentrate into a corresponding plurality of water discharge lines. A large capacity mid-ship pump delivers water through a manifold to that several water discharge line. Each of the water discharge lines having a foam capability includes a water flow meter that produces an electrical signal proportional to the volume rate of flow of water through the water discharge lines. Each of the foam concentrate delivery lines that are coupled individually to the water discharge lines also includes a flow meter that provides an electrical signal proportional to the volume rate of flow of liquid foam concentrate through that delivery line. An electrical control valve is disposed in series with the foam concentrate measuring flow meters in each of the concentrate delivery liens. The system further includes a plurality of microprocessor-based line controller modules that are arranged to receive as inputs, the outputs from an associated water flow meter and foam flow meter. The microprocessor-based controller is programmed to compare the actual proportion or concentration of liquid chemical foamant in the mixture exiting the discharge lines with a predetermined set point value and to develop a control signal, which when applied to the foam concentrate control valve, adjusts the introduction of foam concentrate until the desired set point value is attained. Further, a main controller module is connected to receive information from each of the several line controllers and it is programmed to develop a control signal for adjusting the operation of the foam pump to always insure an adequate supply of foam concentrate to the individual foam concentrate delivery lines.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
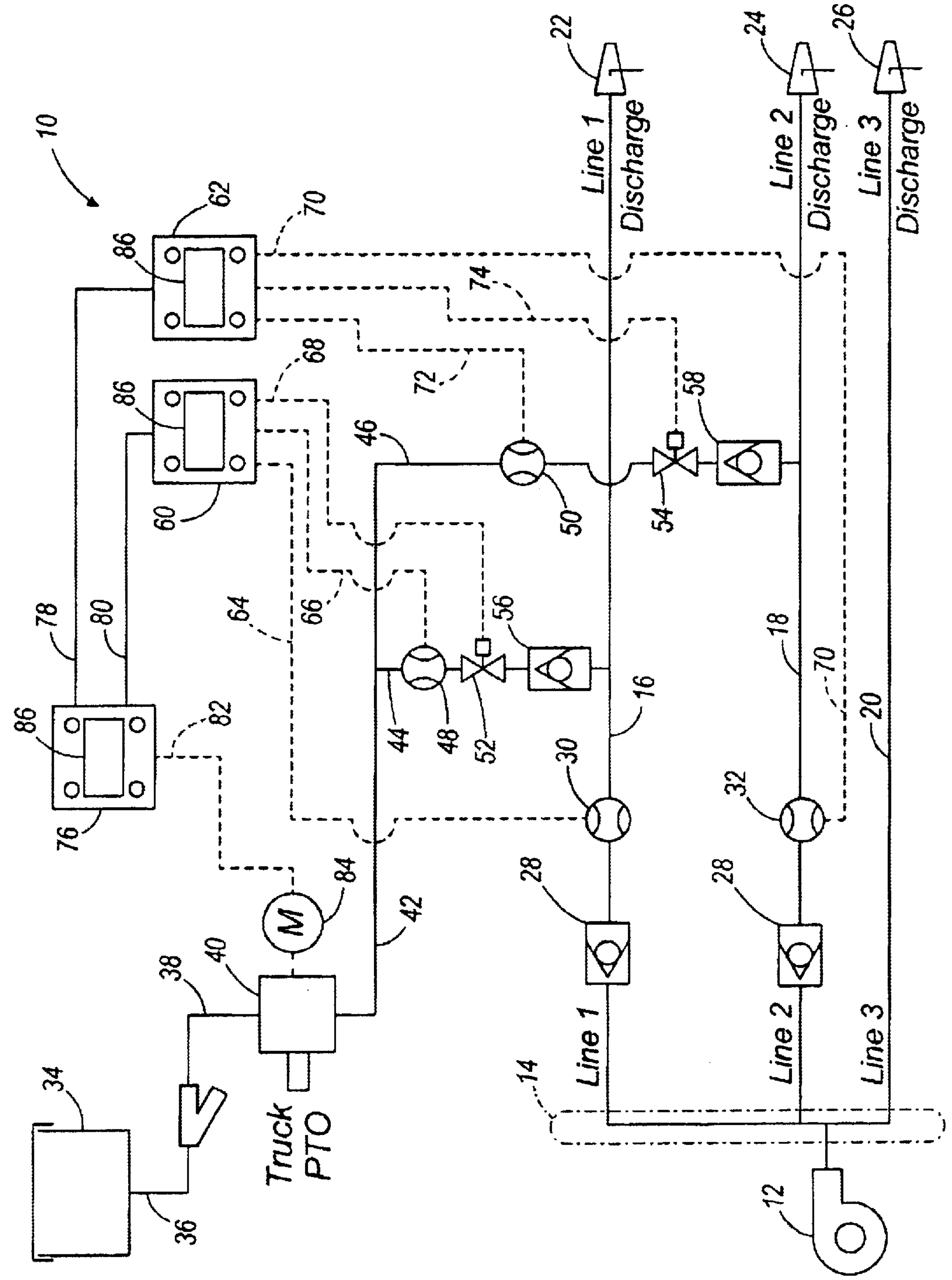
FIG. 1 is a schematic block diagram of a foam proportioning system for fire-fighting applications comprising a preferred embodiment of the present invention.

With reference to FIG. 1, the foam proportioning system is indicated generally by numeral 10 and is seen to include a main water pump 12 for delivering water under pressure from a water supply and through a manifold shown enclosed in dashed lines 14 to a plurality of discharge lines 16, 18 and 20. While the diagram of FIG. 1 shows three water discharge lines emanating from the manifold 14, it is to be appreciated that the system is not so limited and a greater number of discharge lines may be provided. It should also be understood that the several discharge lines 16, 18 and 20 might be of differing sizes to accommodate a variety of water flow rates therethrough. For example, line 1 might be a large diameter hose leading to a water cannon while line 18 may be of a relatively smaller internal diameter. The discharge lines 16 and 18 terminate in flow control nozzles 22 and 24. Line 20 includes a flow control nozzle 26 in like manner.

The foam proportioning system 10 is quite flexible in that it can be configured to control the injection of liquid chemical foamant into only selected ones of the plurality of discharge lines 16, 18, 20. In the depicted embodiment, the system is configured to inject foam concentrate into only discharge lines 16 and 18, leaving discharge line 20 to deliver water only.

For those discharge lines that are configured to deliver a water/foam mixture to a fire (lines 16 and 18), there is included in the water discharge line 16 a check valve, as at 28, and a water flow meter 30. A flow meter 32 is in discharge line 18. The water flow meters may be either of the common paddlewheel-type or they may be commercially available magnetic-type flow meters. Smaller lines may use a more economical paddle-wheel design while larger (typically 4 in. and higher) lines will preferably use the magnetic type of flow meter. The magnetic style flow meters exhibit a wider flow range and are less affected by turbulence and can be used where straight inlet runs are limited in length.

Liquid foam chemical concentrate is contained within a refillable storage tank 34 carried by the fire-fighting vehicle. The tank has an outlet 36 coupled to an inlet port 38 of a foam supply pump 40. The foam supply pump 40 may be a positive displacement pump preferably like that described in co-pending U.S. patent application Ser. No. 10/140,254, filed May 6, 2002, and entitled "Variable Displacement, Positive Displacement Pump", the contents of which are hereby incorporated by reference. That pump has a control shaft that can be manually turned or turned by a motor to thereby change the angle of a swash plate to thereby change the displacement of the pump's plungers. The crank shaft of the pump 40 is adapted to be coupled to the power take-off of the engine for the fire-fighting vehicle causing the pump's plungers to deliver the liquid chemical foam concentrate under pressure through the line 42 to foam concentrate delivery lines 44 and 46. There is one such delivery line for each water line that is to have a foam capability.

Foam concentrate delivery line 44 is associated with water discharge line 16 while foam concentrate delivery line 46 is associated with water discharge line 18. In the exemplary embodiment of FIG. 1, water delivery line 20 does not have a foam capability and, hence, there is no foam concentrate delivery line associated with it. Each of the foam concentrate delivery lines utilized in the system incorporates a foam flow meter as at 48 and 50. The foam flow meters are preferably of the magnetic style and are capable of covering the smaller flow ranges. Connected in series with the foam flow meters 48 and 50 are foam control valves 52 and 54 that are operated by a DC voltage. They may be a ball valve, a gate valve or other type of variable orificed-type valve.

Also included in the foam concentrate delivery lines 44 and 46 are injection check valves as at a56 and 58 which serve to keep water and foam concentrate from mixing on their own.

Associated with each of the foam concentrate delivery lines is a line controller module as at 60 and 62. Line controller module 60 receives input electrical signals from the water flow meter 30, via conductor 64, and electrical input signals from the foam flow meter 48 by way of conductor 66. In the drawing of FIG. 1, electrical conductors and electrical buses are shown in broken line representation to distinguish them from the water and foam conduits utilized.

As will be explained in greater detail below, each of the line controllers includes a microprocessor that monitors the water flow meter and the foam flow meter and provides a drive signal to an associated control valve. Thus, line controller 60 provides a control signal over conductor 68 to the foam control valve 52 to adjust its orifice size. In a similar fashion, line controller 62 receives input signals from the water flow meter 32, via conductor 70, as well as electrical signals from the foam concentrate flow meter 50, via conductor 72. The line controller 62 then provides an appropriate DC signal over line 74 to the foam control valve 54.

The microprocessors in the line controllers 60 and 62 provide data to a main controller 76, via buses 78 and 80, to set the amount of total foam concentrate that needs to be delivered to the individual lines to satisfy their rate of discharge. To vary the flow rate of foam concentrate through the line 42, the main controller 76 provides an appropriate electrical signal over conductor 82 to a DC motor 84 that is connected in driving relation to the swash plate control shaft of the positive displacement variable displacement foam pump 40. In this fashion, the main controller is capable of adjusting the displacement of the pump 40 to deliver the total required foam to the system.

While the positive displacement variable displacement foam pump described in the aforereferenced Maki et al. patent application is well suited to the foam proportioning system of the present invention, those skilled in the art will appreciate that a hydraulic gear pump and hydraulic motor of appropriate capacity may also be employed and, in this event, the control signal on line 82 would be such as to vary the speed of the hydraulic motor to produce the required total foam flow for the system.

Having described the overall layout of the foam proportioning system configured in accordance with the present invention, a more specific explanation of the constructional and operational features of the proportioning system 10 will now be described.

As is typical with fire-fighting apparatus, there are a plurality of discharge lines 16, 18 and 20 downstream of a main water pump 12. The system may be required to have some, or all, of these discharge lines capable of flowing a water/foam mixture, or water only, out the discharge nozzles 22, 24 and 26. In addition, each foam/water mixture line typically requires a different foam-to-water proportion, depending on the nature of the fire being fought. Thus, each discharge line must be planned and constructed during the construction of the fire-fighting assembly, be it a pumper vehicle, a fireboat, or other apparatus. The actual number of total lines and foam capable lines in a given system will vary as the system is designed. The proportioning ratios are determined in the line controllers 60 and 62 for each foam capable line. In the system of FIG. 1, for example, the discharge line 16 may be configured to deliver a three percent (3%) foam concentrate mixture while line 2 might be configured to use a six percent (6%) foam-to-water concentration. Each of the foam capable discharge lines 16 and 18 is identical in component layout and has a waterway check valve 28 to insure that foam mixture will not regress into the water pump, water source or the other lines. Each foam capable discharge line will also include a foam injection line 44, 46 that is specifically attached to it. It may be noted at this point that a plurality of discharge lines could be manifolded off any one of the discharge lines so long as those manifolded lines require the exact same foam concentration.

As indicated, for each foam capable water discharge line, there must be one associated foam concentrate delivery line.

Considering the make-up of the foam concentrate delivery lines, the injection check valves 56 and 58 employed preferably, but not necessarily, may have a minimum cracking pressure of 6 psi and a 400 psi minimum working pressure. The injection check valves are also made from materials that are capable with the foam being pumped. The inlet of the check valves 56 and 58 connect to the outlet from the foam control valves 52 and 54 and the outlet of the check valves 56 and 58 are connected to the associated water discharge lines which thereby receive the proportioned foam flow. The foam control valves preferably each comprise a two-way ball valve having a minimum working pressure of about 400 psi. The valve includes an electrical device to variably open, meter and close the valve orifice. As mentioned, the associated line controller 60 or 62 provides the control signals for the valve.

The foam flow meters 48 and 50 may also have a minimum pressure rating of 400 psi working pressure and is designed to produce a digital pulse signal proportional to the foam flow and this signal is delivered to its associated line controller 60 or 62. Power supplied to the flow meter can be either 12 volt or 24 volt automotive DC, depending upon the battery powering the fire-fighting vehicle in which the foam proportioning system 10 is incorporated.

The line controllers are the principal control mechanism for the operation and processing of information to inject the proper amount of foam into the appropriate water discharge line to achieve a preset (preprogrammed) foam/water concentration. The line controllers receive the flow meter signals from both the water flow meters and the foam flow meters to determine two parameters. One parameter is the displacement or volume of foam required to be delivered from the foam delivery system. The other parameter is to determine the correct positioning of the foam control valves to allow the correct amount of foam to be injected into their respective discharge lines. The objective is to find a balance between the foam delivery system including the pump 40 and the positioning of the foam control valves in the respective foam concentrate delivery lines.

Figure 2:
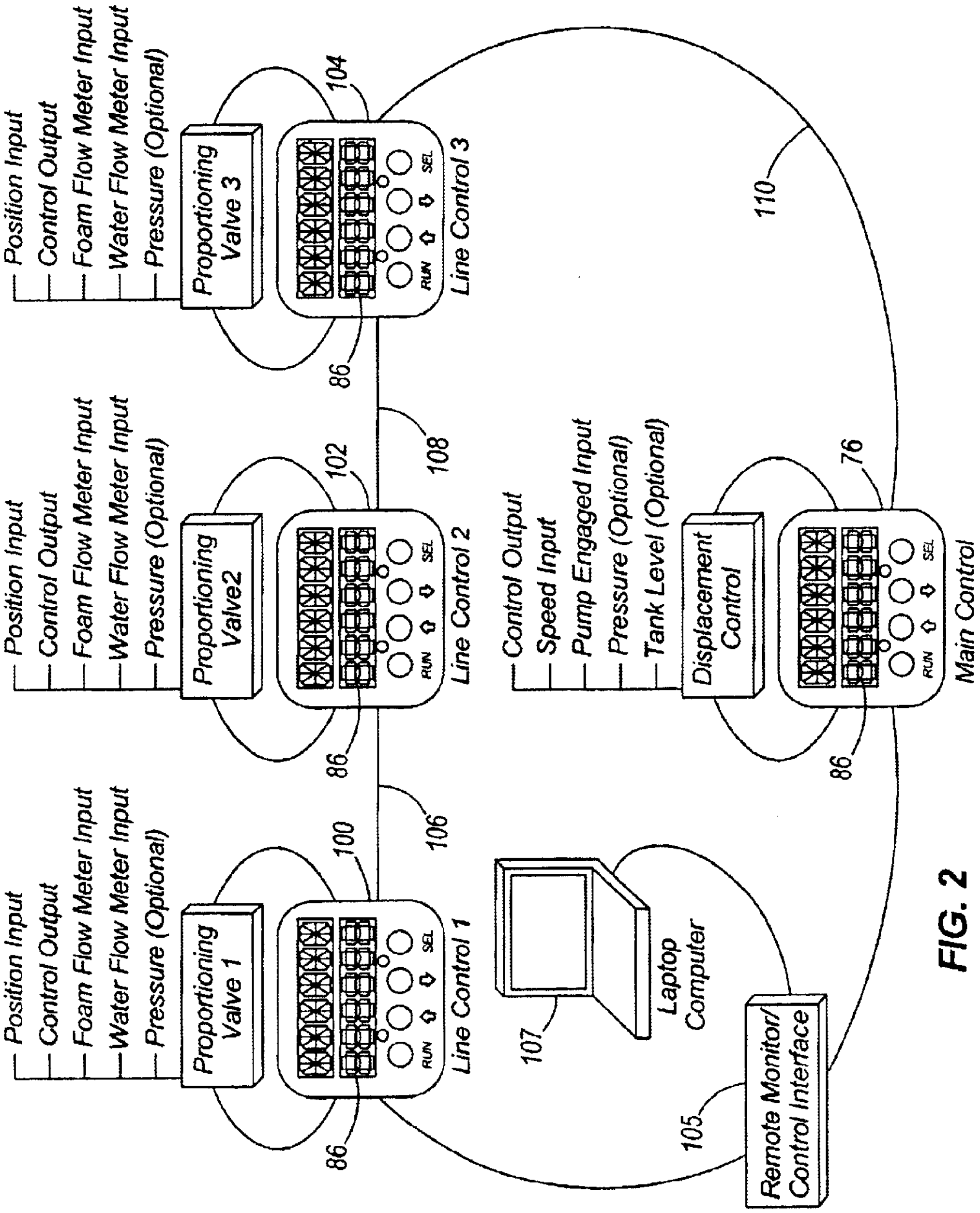
FIG. 2 is a schematic diagram showing the manner in which plural line control modules are daisy-chained together and with a main controller module.

As best seen in FIG. 2, each of the line controllers 60 and 62 and the main controller 76 includes a display screen 86 along with four manually accessible and operable pushbutton switches represented by the circles on these modules. A first push button is used to toggle the respective controller between an "on" and an "off" state. Another pushbutton has an upwardly pointing arrow and a third has a downward pointing arrow and the fourth pushbutton is used to select a menu item. The line controllers have preset or default settings that are programmable by the user for the proportion of foam-to-water desired. The preset may be overridden at any time by pressing the "up" or "down" pushbutton to toggle the proportion percentage in 0.1 percent increments on the display screen. The line controller also displays the current water flow rate, total water flowed, foam flow rate and total foam flowed. The "select" button determines which value to be displayed at any given time.

Referring still to FIG. 2, there is schematically illustrated the manner in which a plurality of line controller modules 100, 102 and 104 are connected to one another and to the main controller module 76. The line controllers 100, 102 and 104 are daisy-chained to one another. As is indicated in this diagram, line controller 100 obtains information from its associated foam flow meter and water flow meter to develop a control output signal for its proportioning valve. The amount of foam concentrate flowed through the foam flow meter passes from line controller 100 to main controller 76, via bus 106, 108 and 110. The amount of foam concentrate flowed through the foam concentrate delivery line associated with line controller 102 is passed via bus 108 and 110 to main controller. Line controller 104 provides its flow information by way of bus 10.

The main controller 76 comprises the hub of the system 10, receiving flow information from all of the line controllers to determine the amount of foam flow to generate. The main controller 76 accordingly adjusts the displacement of the foam pump 40 (FIG. 1) via the motor 84 when a variable displacement, positive displacement pump is used as the foam delivery pump 40. As a further feature of the invention, the system bus may couple to a remote monitor/control interface 105 whereby communication over a network to a remote computer 107 can be achieved.

Figure 3:
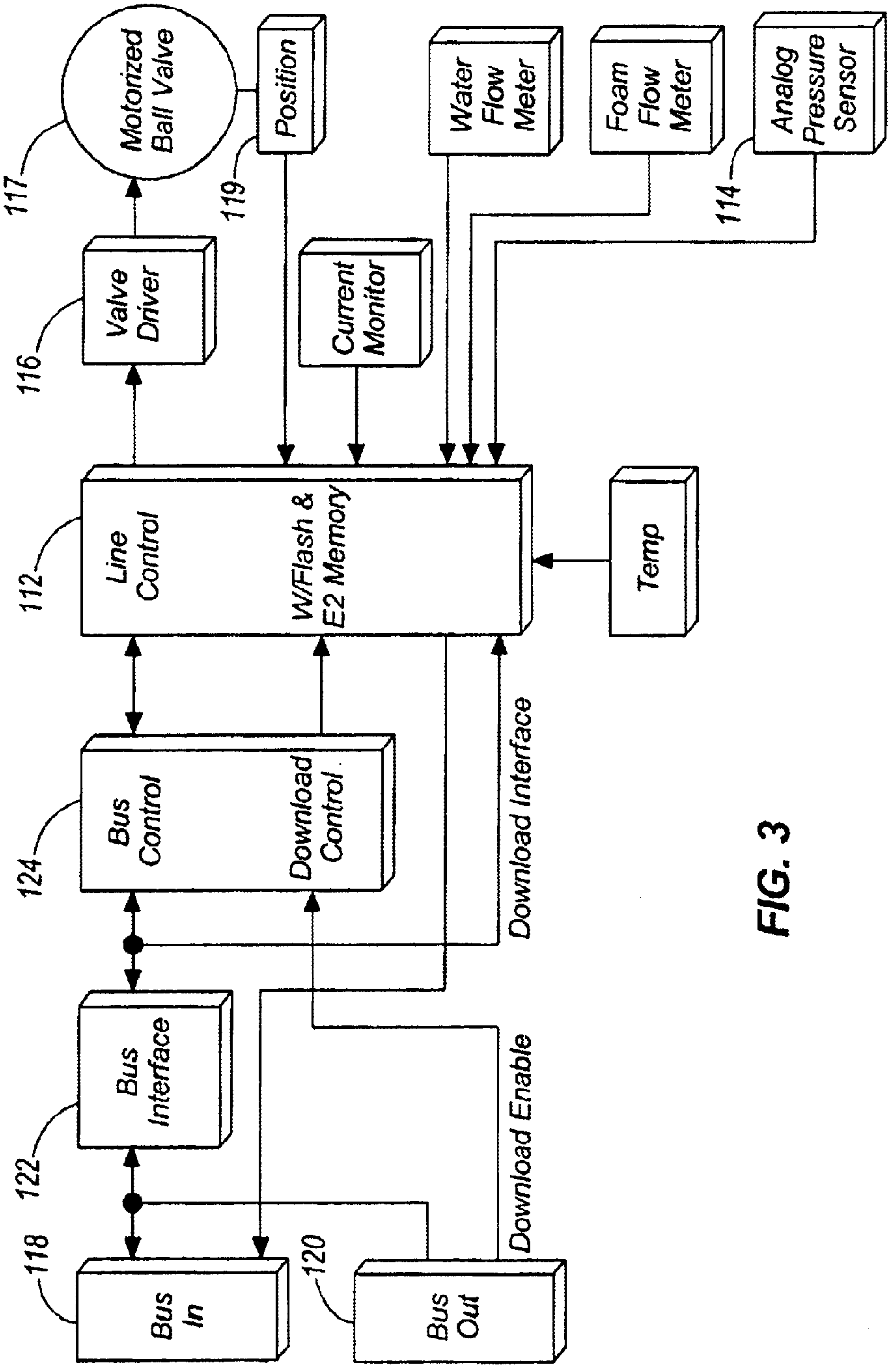
FIG. 3 is a block diagram of the line controller used in the system of FIG. 1.

Turning next to FIG. 3, there is shown a block diagram of the circuitry contained within each of the line control modules 60, 62 (FIG. 1 or 100, 102 and 104 FIG. 2). Each includes a line control microprocessor 112 having a flash memory and an electrically erasable PROM memory for storing a program of instructions as well as operands and intermediate results of computations developed during the execution of the program. As is illustrated in FIG. 3, the line control microprocessor receives inputs from the water flow meter, e.g., water flow meter 30 (FIG. 1) and from the foam flow meter and an input from a pressure sensor 114 that is positioned to sense the line pressure at the water flow meter. Based upon the information derived from the flow meter measurements, a line control microprocessor 112 determines the ratio or concentration of liquid chemical foamant in the water being discharged from the one of the discharge lines with which it is associated and it compares that concentration to a preprogrammed value that had been set into the line control microprocessor. Based upon the difference between the measured values from the desired preset value, the microprocessor in the line controller 112 applies a control signal to a valve driver circuit 116 to reposition the motorized ball valve 117. A position sensing potentiometer 119, in turn, applies a feedback signal to the line control microprocessor to indicate its position and ultimately the ball valve is set at the position to yield the desired rate of chemical flow into the water discharge line.

The line control microprocessor 112 is also arranged to communicate with a downstream line controller as well as with the main controller and, in this regard, there is provided a "Bus In" connector 118 and a "Bus Out" connector 120 that connect through a two-wire differential serial bus interface 122 under control of a bus control module 124. It has been found expedient to use the Controller Area Network (CAN Bus) architecture as outlined in ISO 11898. Such a CAN Bus operates in noisy electrical environments with a high level of data integrity and its open architecture and user-definable transmission medium make it extremely flexible.

The modules 100–104 and 76 in FIG. 2 have an upper LCD or LED display that allows for 12 alpha/numeric characters plus a decimal point and a lower LCD or LED display of six alpha/numeric digits plus a decimal point. As such, the upper display can be used to display the name of a parameter such as “pressure”, “temperature”, “water flow”, “chemical flow” etc. while the lower display provides an associated decimal quantative value of the indicated parameter.

Figure 4:
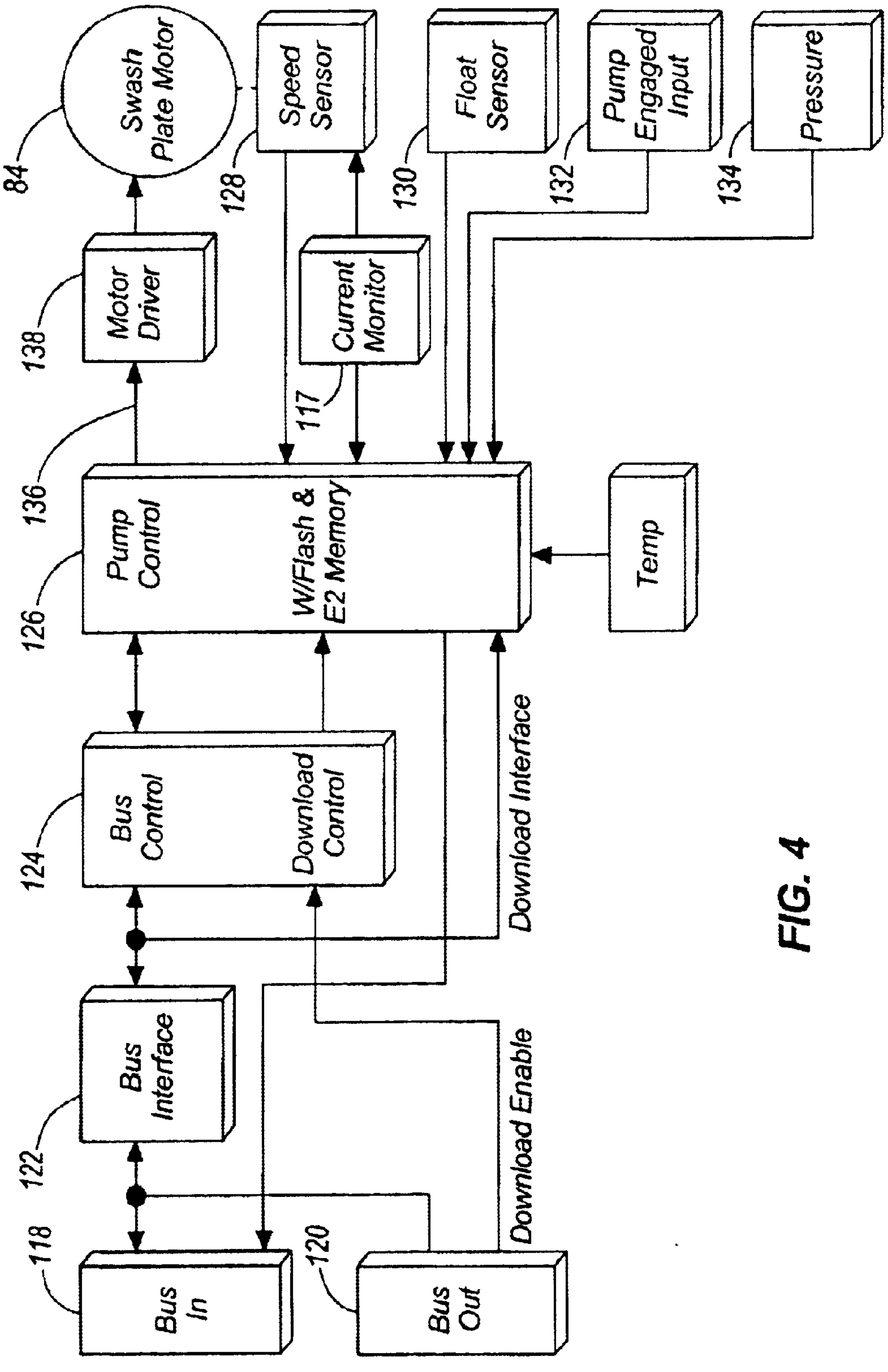
FIG. 4 is a block diagram of the main controller used in the embodiment of FIG. 1.

Turning next to FIG. 4, there is shown a block diagram representation of the main control module 76 that monitors chemical usage in each of the foam capable lines and adjusts the stroke or speed of the foam supply pump 40 (depending on the type of pump utilized) to insure that adequate quantities of liquid chemical foamant are made available to the foam concentrate delivery lines 44 and 46. The main controller includes a pump control microprocessor 126 that receives as inputs a speed signal, via speed sensor 128, indicative of the rotational speed of the motor 84 driving the control shaft of the foam supply pump that varies the tilt angle of the swash plate in the variable displacement positive displacement pump 40. The shaft of the motor 84 has an encoder wheel associated therewith and the speed sensor 128 comprises a pickup that is coupled to the encoder to provide a pulse rate proportional to shaft rotation.

Also providing an input to the pump control microprocessor 126 is a float sensor 130 that is disposed in the chemical supply tank 34 to provide an indication that an adequate quantity of liquid chemical foamant is present in the tank so that operation can continue. The power take off (PTO) of the fire vehicle also provides a signal to indicate that it is running. It is referred to as the “Pump Engaged Input” 132 in FIG. 4. Finally, a signal indicative of manifold pressure at manifold 14 (FIG. 1) is applied. The program stored in the memory of the pump control microprocessor 126 in the main controller module uses information from the sensors, along with information provided over the bus from the line controllers, to develop a control signal on output line 136 and the motor driver 138 to actuate the swash plate motor 84 connected to the control shaft of the variable displacement positive displacement pump 40 to rapidly adjust the swash plate angle and, therefore, foam concentrate flow.

The current monitor 117 comprises a very low value resistor on a ground end of a bridge circuit in the motor driver 138 whose voltage drop is proportional to the current being drawn by the swash plate motor 84. A RC filter is connected to the top of the resistor and connects to an input of a voltage amplifier. The output of the amplifier is inputted to the pump control microprocessor 126 and a current overload detector.

The monitor circuit 117 serves two purposes. First, it provides the microcontroller 126 with an analog value representative of the actual average motor current drawn by the swash plate motor 84. The pump control microprocessor 116 is constantly monitoring the current level several times a second. When the swash plate motor 84 drives the swash plate to an end position, the current will rise and the motor stepping pulses go to zero. By running the motor to both end points for the swash plate, the pump control microprocessor can determine the value of pump 40 output based on speed sensor 128 pulses (e.g. X pulses=1 gallon). The microprocessor-based pump controller 126 can then, during operation, move the swash plate to a predicted value based on sensor pulse counts. This allows for more rapid movement to get close to a desired operating set point before correction based upon actual flow meter readings take over.

The second function of the monitor circuit 117 is to protect the electronics from severe overload conditions. It does this by disabling the motor driver 138 whenever the current being drawn exceeds a predetermined value, say, 30 amps, for longer than a predetermined monitor filter time, say about 50 ms. The overload also sets an “overload detected” latch that indicates to the pump control microprocessor 126 that an overload has occurred and that a diagnostic routine should be run to determine the cause of the overload.

In that the bus structure for the main controller module is identical to that used with the line controller and which has been explained above, no further discussion thereof is deemed necessary.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. An apparatus in which metered quantities of a liquid foam concentrate are injected into a plurality of water discharge lines conveying a water stream to thereby establish a predetermined concentration of the liquid foam concentrate in the water stream, comprising:

(a) a tank for holding the liquid foam concentrate;

(b) a positive displacement foam pump having an inlet port coupled to the tank and an outlet port;

(c) a plurality of water discharge lines, each adapted to convey raw water from a source thereof to a discharge orifice selected from one of the water discharge lines including a water flow sensor;

(d) a plurality of foam concentrate delivery lines leading from said outlet port of the foam pump to individual ones of the plurality of water discharge lines having a water flow sensor, each of the foam concentrate delivery lines including an electrically operated foam valve and a foam flow sensor; and (e) a line controller module for each of the foam concentrate delivery lines, the line controller modules coupled to receive flow information from the water flow sensor and the foam flow sensor of a water discharge line and a foam concentrate delivery line with which a given line controller module is associated and providing a control signal to the electrically operated foam valve for the foam concentrate delivery line with which said given line controller module is associated.

2. The apparatus as in claim 1 wherein the line controller modules each include a microprocessor with a memory adapted to store a program of instructions for computing an instantaneous liquid foam concentrate to raw water proportion in the water discharge line with which the line controller module is associated and for comparing the computed instantaneous proportion to a desired set-point value.

3. The apparatus as in claim 2 and further including a main controller module coupled to receive information from each of the plurality of line controller modules for developing a control signal for adjusting the flow rate of the foam pump.

4. The apparatus as in claim 3 wherein the foam pump is a variable displacement positive displacement pump.

5. The apparatus as in claim 3 and further including a motor coupled to receive said control signal, said motor connected in driving relation to a displacement control shaft of the variable displacement, positive displacement pump.

6. The apparatus as in claim 1 wherein each of said line controller modules includes an alphanumeric display panel to provide a visual presentation of predetermined operational parameters.

7. The apparatus as in claim 3 wherein said main controller module includes an alphanumeric display panel to provide visual presentation of predetermined operational parameters.

8. The apparatus as in claim 3 wherein the plurality of line controller modules are bus connected to one another and: to the main controller module.

9. The apparatus as in claim 3 wherein the main controller module and each of the line controller modules include a manual data entry pushbutton keypad.

10. The apparatus as in claim 8 wherein the plurality of line controller modules and the main controller module each include a microprocessor having a memory for storing a program of instructions and the bus further connects to a personal computer whereby the program of instructions can be downloaded from the personal computer to the memories of the microprocessors included in the main controller module and the line controller modules.

11. A foam proportioning apparatus for controlling and monitoring the introduction of a liquid chemical foam concentrate into a plurality of water discharge lines in a fire fighting system, comprising:

(a) a tank for containing a liquid chemical foam concentrate;

(b) a main water pump coupled through a manifold to a plurality of water discharge lines, said water discharge lines each having a flow control discharge nozzle whereby the flow rate through each discharge line can be varied;

(c) a water flow meter in selected ones of said water discharge lines and producing electrical signals proportional to the water flow rate through said water discharge lines;

(d) a variable displacement positive displacement pump having an inlet, an outlet and a control shaft for altering the displacement of the pump;

(e) a motor coupled to said control shaft;

(f) means for coupling the inlet of the positive displacement pump to said tank and said outlet to foam concentrate delivery lines;

(g) an electronically controlled foam concentrate control valve disposed in foam concentrate delivery lines feeding foam concentrate to individual ones of the plurality of water discharge lines;

(h) a flow meter disposed in the foam concentrate delivery lines and producing an electrical signal proportional to the rate of flow of the liquid foam concentrate through said foam concentrate delivery lines;

(i) a plurality of line controller modules individually associated with a given one of the plurality of water discharge lines and adapted to receive the electrical signal from the flow meter in the water discharge line with which it is associated and the electrical signal from the flow meter of the foam concentrate delivery line feeding that water discharge line, the line controller modules providing control signals to the foam concentrate control valve to maintain a predetermined concentration of foamant exiting the associated discharge line; and (j) a main controller module coupled to the plurality of line controller modules for receiving information on the rate of flow of liquid chemical foam concentrate in each of the plurality of foam concentrate delivery lines and for developing a control signal for said motor whereby the displacement of the positive displacement pump is adjusted to provide an amount of foam concentrate sufficient to meet the total demand called for by the plurality of line controller modules.

* * * * *